(12) United States Patent
Eberl et al.

(10) Patent No.: US 11,137,376 B2
(45) Date of Patent: Oct. 5, 2021

(54) PHOTOACOUSTIC GAS SENSOR AND METHOD FOR OPERATING A PHOTOACOUSTIC GAS SENSOR

(71) Applicant: Infineon Technologies AG, Neubiberg (DE)

(72) Inventors: Matthias Eberl, Taufkirchen (DE); Thomas Albrecht, Munich (DE)

(73) Assignee: Infineon Technologies AG, Neubiberg (DE)

( * ) Notice: Subject to any disclaimer, the term of this patent is extended or adjusted under 35 U.S.C. 154(b) by 293 days.

(21) Appl. No.: 16/408,712

(22) Filed: May 10, 2019

(65) Prior Publication Data

US 2019/0360975 A1 Nov. 28, 2019

(30) Foreign Application Priority Data

May 23, 2018 (DE) .......................... 102018112341.8

(51) Int. Cl.
*G01N 29/24* (2006.01)
*G01N 29/02* (2006.01)
*G01N 29/22* (2006.01)

(52) U.S. Cl.
CPC ......... *G01N 29/2431* (2013.01); *G01N 29/02* (2013.01); *G01N 29/228* (2013.01); *G01N 29/2425* (2013.01); *G01N 2291/021* (2013.01)

(58) Field of Classification Search
CPC ........... G01N 29/2431; G01N 29/2425; G01N 29/02; G01N 29/024; G01N 29/228; G01N 29/326; G01N 29/14; G01N 2291/021; G01N 2291/012; G01N 2021/1704; G01N 21/1702
See application file for complete search history.

(56) References Cited

U.S. PATENT DOCUMENTS

| 5,841,017 A | 11/1998 | Baraket et al. | |
|---|---|---|---|
| 2008/0127715 A1* | 6/2008 | Kosterev | G01N 21/1702 73/24.02 |
| 2010/0020326 A1 | 1/2010 | Van Kesteren | |
| 2015/0101395 A1* | 4/2015 | Dehe | G01N 29/2425 73/24.02 |
| 2016/0331289 A1 | 11/2016 | Kahlman et al. | |
| 2017/0350868 A1* | 12/2017 | Tumpold | G01N 29/222 |

FOREIGN PATENT DOCUMENTS

DE 102014114672 A1 4/2015

* cited by examiner

*Primary Examiner* — Suman K Nath
(74) *Attorney, Agent, or Firm* — Harrity & Harrity LLP (57) ABSTRACT

A photoacoustic gas sensor includes a hermetically sealed housing filled with a reference gas. The photoacoustic gas sensor furthermore includes a microphone arranged in the housing and configured to generate a microphone signal as a function of a sound wave based on light incident in the housing. Furthermore, the photoacoustic gas sensor includes a controllable heat source arranged in the housing and configured to selectively thermoacoustically excite the reference gas in order to generate a thermoacoustic sound wave phase-shifted with respect to the sound wave.

20 Claims, 4 Drawing Sheets

PHOTOACOUSTIC GAS SENSOR AND METHOD FOR OPERATING A
PHOTOACOUSTIC GAS SENSOR

CROSS REFERENCE TO RELATED APPLICATION

This application claims priority under 35 U.S.C. § 119 to German Patent Application No. 102018112341.8 filed on May 23, 2018, the content of which is incorporated by reference herein in its entirety.

TECHNICAL FIELD

Example implementations relate to a photoacoustic gas sensor and to a method for operating a photoacoustic gas sensor.

BACKGROUND

Photoacoustic measurement systems utilize a modulated, infrared broadband source for emitting infrared radiation. The radiation is guided through a measurement section and partly absorbed by a gas contained therein in a specific wavelength range. The remaining radiation subsequently enters a reference cell having a microphone through an optical window, the reference cell being hermetically closed and completely filled with a reference gas. The remaining energy of the radiation is absorbed by the reference gas in the reference cell, as a result of which the reference gas heats up and expands. The pressure difference arising in the reference cell as a result can be measured as a sound wave by the microphone.

Besides the photoacoustic effect, the thermoacoustic effect is also of importance for photoacoustic measurement systems. In the case of the thermoacoustic effect, the gas is heated not by the incident infrared radiation, but rather by convection and heat conduction of heated regions of the reference cell. By way of example, the broadband infrared radiation is absorbed at the walls of the reference cell. This leads to heating of the chamber walls and, by virtue of corresponding heat transfer, to a rise in the temperature of the gas. This results in a rise in pressure within the reference cell and a sound wave resulting therefrom. The sound wave brought about by the photoacoustic effect is in phase with the sound wave brought about by the thermoacoustic effect, thus resulting in a superimposed sound level at the microphone. This leads to a poor signal-to-noise ratio (SNR), poor utilizability of the measurement region present and hence poor measurement results.

SUMMARY

There is, thus, a need to provide a photoacoustic gas sensor which makes it possible at least to reduce the influence of the thermoacoustic effect on the sound measurement.

The need can be met by the subject matter of the present claims.

One example implementation relates to a photoacoustic gas sensor comprising a hermetically sealed housing filled with a reference gas. The photoacoustic gas sensor furthermore comprises a microphone arranged in the housing and configured to generate a microphone signal as a function of a sound wave based on light incident in the housing. Furthermore, the photoacoustic gas sensor comprises a controllable heat source arranged in the housing and configured to selectively thermoacoustically excite the reference gas in order to generate a thermoacoustic sound wave phase-shifted with respect to the sound wave.

A further example implementation relates to a method for operating a photoacoustic gas sensor comprising a hermetically sealed housing filled with a reference gas. The method comprises generating a microphone signal using a microphone arranged in the housing as a function of a sound wave based on light incident in the housing. Furthermore, the method comprises selectively thermoacoustically exciting the reference gas using a controllable heat source arranged in the housing in order to generate a thermoacoustic sound wave phase-shifted with respect to the sound wave.

BRIEF DESCRIPTION OF THE FIGURES

Some examples of devices and/or methods are explained in greater detail merely by way of example below with reference to the accompanying figures in which.

DESCRIPTION

Various examples will now be described more thoroughly with reference to the accompanying figures, in which some examples are illustrated. In the figures, the thicknesses of lines, layers and/or regions may be exaggerated for elucidation purposes.

While further examples are suitable for various modifications and alternative forms, some specific examples thereof are accordingly shown in the figures and described thoroughly below. However, this detailed description does not limit further examples to the specific forms described. Further examples can cover all modifications, counterparts and alternatives that fall within the scope of the disclosure. Throughout the description of the figures, identical or similar reference signs refer to identical or similar elements which can be implemented identically or in modified form in a comparison with one another, while they provide the same or a similar function.

Unless defined otherwise, all terms (including technical and scientific terms) are used here in their customary meaning in the field with which examples are associated.

Figure 1:
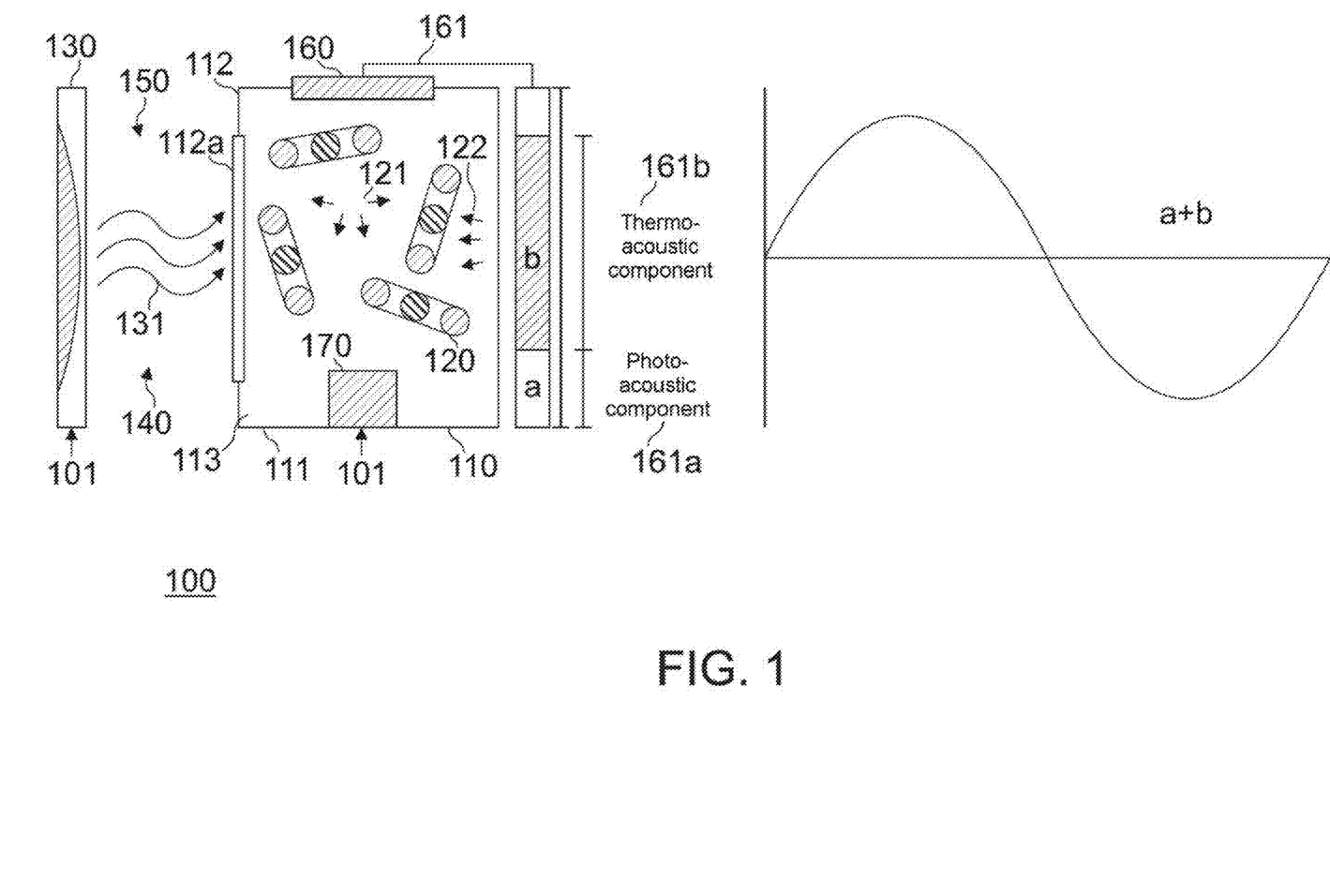
FIGS. 1 to 3 show one example implementation of a photoacoustic gas sensor in various operating situations.

FIG. 1 shows a photoacoustic gas sensor 100 comprising a housing 110 having a housing body 111 and a housing cover 112 with an inlet window 112a. Housing body 111 and also housing cover 112 can be formed from a multiplicity of different materials. The housing body 111 can be formed from ceramic or metal, for example, while the housing cover 112 can be formed from ceramic, metal, semimetal (e.g. silicon), sapphire or glass. The inlet window 112a is fabricated from a material that is substantially transparent to light of one or a plurality of predetermined wavelengths (e.g. glass).

The housing cover 112 closes off a cavity 113 of the housing body 111, such that the housing 110 is hermetically sealed. In other words: the housing cover 112 is fitted to the housing body 111 in such a way that substantially no gas exchange can take place between the cavity 113 and the atmosphere surrounding the housing 110. It goes without saying here, however, that it is not always possible for the housing cover 112 to be fitted to the housing body 111 in a perfectly sealing manner on account of customary process engineering fluctuations or tolerances. Accordingly, the term "hermetically sealed" in the context of the present application also includes instances where the housing cover 112 is secured to the housing body 111 in a manner allowing a certain (very low) leakage into or out of the cavity 113. The housing cover 112 can be fitted to the housing body 111 for example using welding (e.g. seam welding, resistance welding or laser welding), soldering (with or without the use of preforms) or glass frit bonding.

The cavity 113 is filled with a reference gas 120. The reference gas 120 is configured to at least partly absorb light at one predetermined wavelength or a plurality of predetermined wavelengths. In other words: radiation components of the light at the one predetermined wavelength or the plurality of predetermined wavelengths interact with the reference gas 120 and in the process emit at least part of their energy to the reference gas. The reference gas can be, for example, $CO_2$, CO, $H_2O$, $CH_4$, $O_3$, $NH_4$, $NO_x$ or $N_2O$. However, it is also possible to use any other gas that absorbs photons at the one predetermined wavelength or the plurality of predetermined wavelengths. The plurality of wavelengths can be e.g. successive wavelengths, such that the reference gas 120 absorbs optical radiation over a predetermined spectral range. Alternatively, the plurality of wavelengths can also be separated from one another in the spectrum. By way of example, the reference gas 120 (e.g. $CO_2$) can be configured at least partly to absorb infrared radiation.

Furthermore, the photoacoustic gas sensor 100 comprises a radiation source 130 configured to generate light 131 on the basis of a modulation signal 101. The radiation source 130 can generate the light 131 with radiation components at a single or a plurality of wavelengths. The radiation source 130 can thus be either a selective emitter or a broadband emitter (e.g. black body emitter or thermal emitter). By way of example, the radiation source 130 can be embodied as a semiconductor component in the form of a light-emitting diode (LED). Alternatively, the radiation source 130 can also be embodied as a laser emitter or any other source of light. The light 131 can comprise both infrared radiation (wavelength of 780 nm to 1 mm) and radiation in the visible range (wavelength of 380 nm to 780 nm). In this case, the light 131 is modulated (e.g. periodically) in accordance with the modulation signal 101.

A measurement region 140 is arranged between the radiation source 130 and the housing 110 and is configured to receive a gas 150 to be examined. The measurement region 140 can either be a closed volume, which is able to be filled with the gas to be examined, or be an open volume (e.g. a volume which is not structurally delimited and which allows gas exchange with the environment). The gas 150 to be examined is intended to be characterized with regard to its concentration. The concentration can be determined by way of the absorption of the light 131 by the gas 150 to be examined.

The photoacoustic gas sensor 100 additionally comprises a microphone 160 arranged in the housing 110 and configured to generate a microphone signal 161 as a function of a sound wave based on the light 131 incident in the housing 110. The microphone 160 can be e.g. a MEMS microphone (MEMS, MicroElectroMechanical System), which can be read e.g. electronically or else optically in order to generate the microphone signal 161. The MEMS microphone can be embodied for example in a semiconductor substrate.

The light 131 incident in the housing 110 is at least partly absorbed by the reference gas 120 at one or a plurality of predetermined wavelengths, such that the reference gas 120 heats up and expands on account of the energy absorption. The heating up of the reference gas 120 in the constant volume enclosed by the housing 110 leads to a pressure change within the cavity 113, which pressure change is measured as a photoacoustic sound wave 121 by the microphone 160. In the cavity 113, therefore, at least part of the optical energy of the light 131 incident in the housing 110 is converted into acoustic energy and the reference gas 120 is thus photoacoustically excited. Since the microphone signal 161 represents the pressure change within the cavity 113, it indicates the amount of energy emitted to the reference gas 120 by the light 131 incident in the housing 110. The concentration of the gas 150 to be examined can be deduced from the microphone signal in accordance with known methods or calculation specifications.

Besides the reference gas 120 being heated up on account of the photoacoustic effect, the reference gas 120 is also heated up on account of the thermoacoustic effect. The light 131 incident in the housing 110 is partly also absorbed by the housing 110 (e.g. by the inner walls of the housing body 111) and thus leads to heating of the housing 110. On account of convection and heat conduction of heated regions of the housing 110, a heat transfer to the reference gas 120 takes place, such that a rise in the temperature of the reference gas 120 occurs. The heating up of the reference gas 120 in the constant volume enclosed by the housing 110 leads to a pressure change within the cavity 113, which pressure change is measured as a thermoacoustic sound wave 122 by the microphone 160.

The photoacoustic sound wave 121 brought about by the photoacoustic effect is in phase with the thermoacoustic sound wave 122 brought about by the thermoacoustic effect, such that the microphone 160 effectively measures a superimposed sound level. The sound wave effectively measured by the microphone 160 thus has a desired photoacoustic portion and also an undesired thermoacoustic portion, both of which are based on the light 131 incident in the housing 110.

Accordingly, the microphone signal 161 also has a photoacoustic signal component 161a, which is based on the photoacoustic portion of the effectively measured sound wave, and a thermoacoustic signal component 161b, which is based on the thermoacoustic portion of the effectively measured sound wave. The resulting signal waveform of the microphone signal 161 is shown in the right-hand region of FIG. 1. The thermoacoustic signal component 161b leads to a reduced SNR of the microphone signal 161, reduced utilizability of the measurement region present and hence non-optimum measurement results.

In order to reduce the influence of the thermoacoustic effect on the microphone signal 161, the photoacoustic gas sensor 100 furthermore comprises a controllable heat source 170 arranged in the housing 110. In the operating situation illustrated in FIG. 1, the controllable heat source 170 is inactive on account of corresponding driving.

Figure 2:
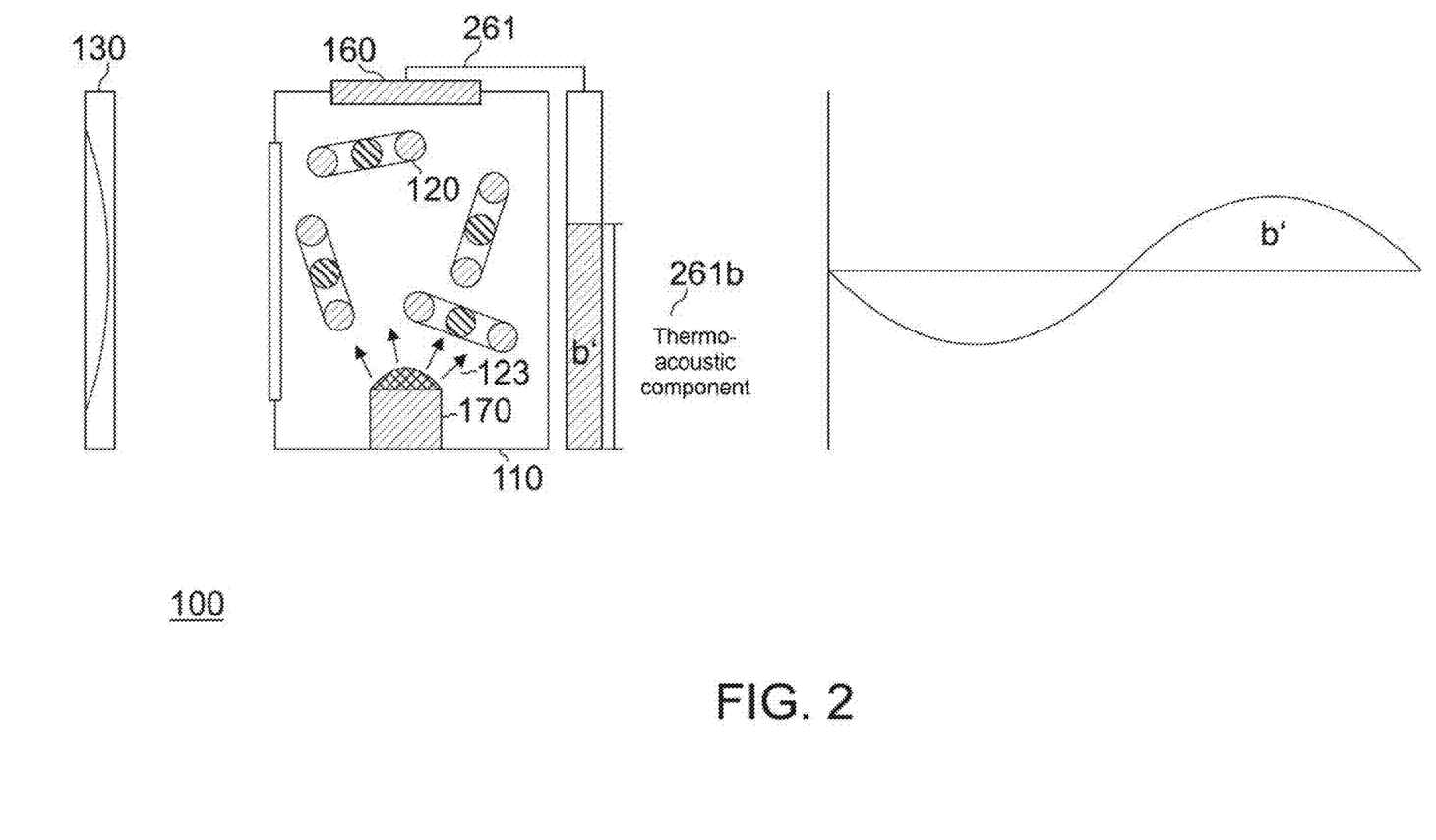

The function of the controllable heat source 170 is explained in greater detail below with reference to FIG. 2. FIG. 2 shows the photoacoustic gas sensor 100 from FIG. 1 in an operating situation in which the radiation source 130 emits no light in the direction of the housing 110. Accordingly, no photoacoustic excitation of the reference gas takes place in the housing 110. In contrast to the operating situation illustrated in FIG. 1, the controllable heat source 170 is active on account of corresponding driving. In the active state, the controllable heat source 170 is configured to thermoacoustically excite the reference gas 120 and thus to generate a thermoacoustic sound wave 123. In other words: the controllable heat source 170 is configured to selectively thermoacoustically excite the reference gas 120. In this case, the controllable heat source 170 can be any element that can heat or heat up the reference gas 120 in a controlled manner. By way of example, the controllable heat source 170 can be a heating element, an electrical resistor, an optical element (which heats the reference gas 120 using the emission of optical radiation), a temperature sensor to which a supply power is applied, or any other electrical element capable of controlled heat emission.

The microphone signal 261 correspondingly generated by the microphone 160 only has a thermoacoustic signal component 261*b*, which is based on the measured thermoacoustic sound wave 123. The resulting signal waveform of the microphone signal 261 is shown in the right-hand region of FIG. 2. As indicated in FIG. 2 by the phase angle of the microphone signal 261 in comparison with the phase angle of the microphone signal 161 shown in FIG. 1, using corresponding driving of the controllable heat source 170 it is possible to set the phase angle of the thermoacoustic sound wave 123 generated by the heat source 170 in relation to the phase angle of the thermoacoustic portion of the sound wave effectively measured by the microphone 160 upon light being incident in the housing 110. Accordingly, the thermoacoustic sound wave 123 generated by the heat source 170 can be utilized at least partly to compensate for the influence of the thermoacoustic portion of the sound wave effectively measured by the microphone 160 in the event of light being incident in the housing 110.

Figure 3:
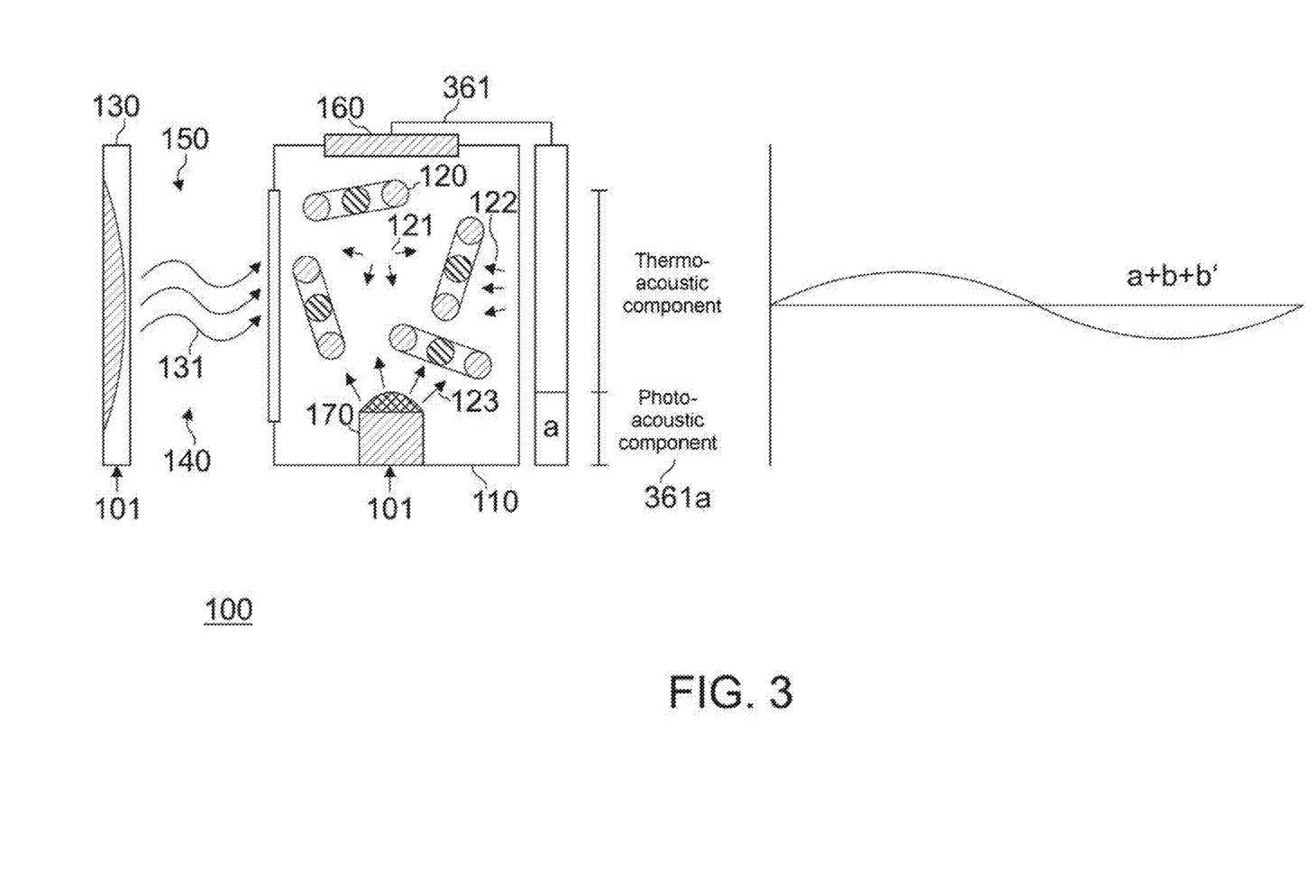

This is shown by way of example in FIG. 3, which shows the photoacoustic gas sensor 100 in an operating situation in which the radiation source 130 and the controllable heat source 170 are active.

The controllable heat source 170 selectively thermoacoustically excites the reference gas 120 in order to generate a thermoacoustic sound wave 123 phase-shifted with respect to the sound wave based on the light 131 incident in the housing 110 (e.g. the superimposition of the sound waves 121 and 122). In this regard, the heat source 170 can thermoacoustically excite the reference gas 120 in such a way that the thermoacoustic sound wave 123 at least partly compensates for the influence of the thermoacoustic portion of the sound wave based on the light 131 incident in the housing 110. In other words: the heat source 170 can thermoacoustically excite the reference gas 120 in such a way that the thermoacoustic sound wave 123 is substantially destructively superimposed on the thermoacoustic sound wave 122, such that a pressure level that is substantially constant over time arises as the result of the superimposed sound waves 122 and 123.

By way of example, the heat source 170 can be configured to thermoacoustically excite the reference gas 120 in such a way that the thermoacoustic sound wave 123 is phase-shifted by 180° with respect to the sound wave based on the light 131 incident in the housing 110. Furthermore, the heat source 170 can be configured to thermoacoustically excite the reference gas 120 in such a way that an amplitude of the thermoacoustic sound wave 123 corresponds to an amplitude of a thermoacoustic portion of the sound wave based on the light 131 incident in the housing 110. In other words: the thermoacoustic sound wave 123 can be generated using the controllable heat source such that it is inverted with respect to the thermoacoustic portion of the sound wave, which is based on the light 131 incident in the housing 110.

On account of the superimposition of the thermoacoustic sound wave 123 thus generated with the thermoacoustic portion of the sound wave based on the light 131 incident in the housing 110 (e.g. the superimposition of the thermoacoustic sound wave 123 with the thermoacoustic sound wave 122), a reduction or compensation of the thermoacoustic effect can be made possible. As mentioned above, a pressure level that is substantially constant over time results from the superimposed sound waves 122 and 123. The pressure level that is constant over time is not detected by the microphone since only pressure changes over time are detected there. As illustrated in FIG. 3, on account of the destructive superimposition, the microphone signal 361 of the microphone can e.g. only comprise a photoacoustic signal component 361*a*, which is based on the photoacoustic portion of the sound wave effectively measured by the microphone 160. The resulting signal waveform of the microphone signal 361 is shown in the right-hand region of FIG. 3. The reduction or compensation of the thermoacoustic effect can lead to an improved SNR of the microphone signal 361, improved utilizability of the measurement region present and hence better measurement results.

As already explained above, the radiation source 130 is configured to generate the light 131 incident in the housing 110 on the basis of a modulation signal 101, e.g. to output modulated light. In order to obtain a destructive superimposition of the thermoacoustic sound wave 123 with the thermoacoustic portion of the sound wave based on the light 131 incident in the housing 110, the heat source 170 can be configured, for example, to thermoacoustically excite the reference gas 120 on the basis of the modulation signal 101 for the radiation source 130 in such a way that the thermoacoustic sound wave is inverted with respect to the thermoacoustic portion of the sound wave, which is based on the light 131 incident in the housing 110. The modulation signal can be inverted e.g. by the heat source 170 itself or a control circuit for the heat source 170, such that the thermoacoustic excitation of the reference gas by the heat source is effected in an inverted manner with respect to the modulated emission of the light 131 by the radiation source 130. By way of example, during an off phase of the radiation source 130, the heat source 170 can generate the thermoacoustic sound wave 123, such that the latter is phase-inverted with respect to the thermoacoustic portion of the sound wave based on the light 131 incident in the housing 110. Setting the amplitude of the thermoacoustic sound wave 123 generated by the heat source 170 to the amplitude of the thermoacoustic portion of the sound wave based on the light 131 incident in the housing 110 can make possible a substantially complete quenching of the thermoacoustic sound wave 122 by the thermoacoustic sound wave 123.

The setting of the amplitude of the thermoacoustic sound wave 123 generated by the heat source 170 can be implemented by measuring the thermoacoustic effect in the absence of the photoacoustic effect. By way of example, the heat source 170 can be configured, for the purpose of selectively thermoacoustically exciting the reference gas 120, to emit thermal energy to the reference gas 120, the thermal energy being chosen depending on an amplitude of the microphone signal at a point in time at which the light 131 incident in the housing 110 contains no radiation components at wavelengths which can photoacoustically excite the reference gas 120. The incidence of the radiation components of the light 131 that photoacoustically excite the reference gas 120 into the housing can be prevented e.g. in the context of a calibration using a suitable filter introduced between the radiation source 130 and the housing 110. The light 131 incident in the housing 110 thus generates a purely thermoacoustic excitation of the reference gas 120, such that the microphone signal of the microphone 160 substantially has only a thermoacoustic signal component. In the operating situation illustrated in FIG. 2, for example, the thermal energy emitted by the heat source 170 can then be set such that the amplitude of the resulting microphone signal of the microphone 160 is substantially equal to the amplitude of the previously determined microphone signal upon the incidence of light 131 without radiation components at wavelengths which can photoacoustically excite the reference gas 120. The calibration can also be carried out dynamically during operation, for example by a filter being switched on in order to filter the light emitted by the radiation source, or by a further radiation source having corresponding wavelengths being used.

As already described above, the heat source 170 can be e.g. a temperature sensor configured to generate an output signal depending on a temperature of the reference gas 120 at a first point in time of operation and to emit thermal energy to the reference gas 120 depending on a received supply power for the purpose of generating the thermoacoustic sound wave 123 at a second point in time of operation. This skillful dual use of the temperature sensor can also make possible the reduction or compensation of the thermoacoustic effect in the photoacoustic gas sensor 100 in addition to the temperature measurement (e.g. for the compensation of effects on account of temperature fluctuations). The photoacoustic gas sensor 100 can thus make possible the reduction or compensation of the thermoacoustic effect e.g. without an additional, specific heat source (such as, for instance, an additional heating element). A reduction of the complexity of the photoacoustic gas sensor 100 can thus also be made possible in addition to a reduction of the production costs.

In this case, the temperature sensor can be configured, for example, to emit the thermal energy depending on the modulation signal 101 for the radiation source 130.

Although not explicitly shown in FIGS. 1 to 3, in the housing 110 besides the microphone 160 and the heat source 170, the photoacoustic gas sensor 100 can comprise further circuits and/or further sensor equipment for the compensation of environmental influences. By way of example, the photoacoustic gas sensor 100 can furthermore comprise an evaluation circuit for evaluating the microphone signal (e.g. in the form of an application-specific integrated circuit, ASIC) and/or a control circuit (e.g. in the form of an ASIC) and/or one or more further microphones and/or a temperature sensor and/or a photodiode.

Figure 4:
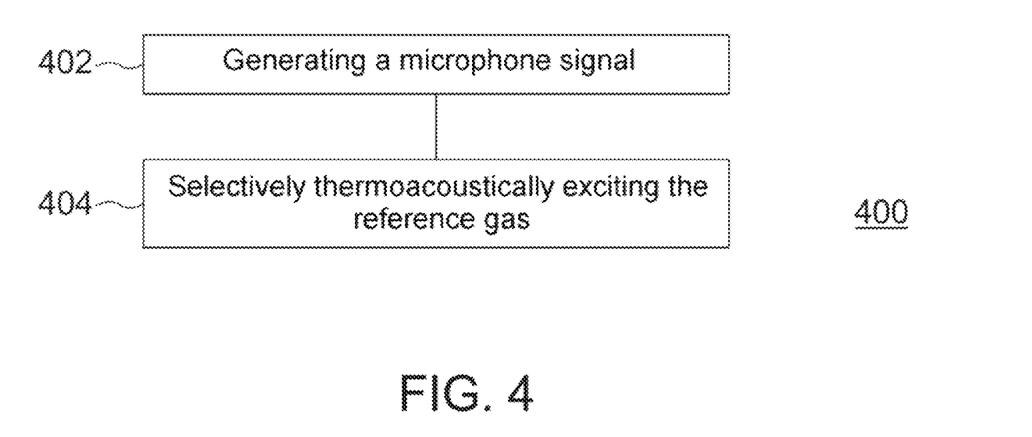
FIG. 4 shows a flow diagram of one example implementation of a method for operating a photoacoustic gas sensor.

In order once again to summarize the above-described aspects concerning the use of the photoacoustic gas sensor, FIG. 4 additionally shows a flow diagram of a method 400 for operating a photoacoustic gas sensor. The photoacoustic gas sensor comprises a hermetically sealed housing filled with a reference gas.

Method 400 comprises generating 402 a microphone signal using a microphone arranged in the housing as a function of a sound wave based on light incident in the housing. Furthermore, method 400 comprises selectively thermoacoustically exciting 404 the reference gas using a controllable heat source arranged in the housing in order to generate a thermoacoustic sound wave phase-shifted with respect to the sound wave.

Further details and aspects of the method have been described above in association with further example implementations (e.g. FIGS. 1 to 3). The method can comprise one or more optional features in accordance with the further example implementations.

The example implementations described herein can be summarized as follows:

Some example implementations relate to a photoacoustic gas sensor comprising a hermetically sealed housing filled with a reference gas. The photoacoustic gas sensor furthermore comprises a microphone arranged in the housing and configured to generate a microphone signal as a function of a sound wave based on light incident in the housing. Furthermore, the photoacoustic gas sensor comprises a controllable heat source arranged in the housing and configured to selectively thermoacoustically excite the reference gas in order to generate a thermoacoustic sound wave phase-shifted with respect to the sound wave.

In some example implementations, the heat source is configured to thermoacoustically excite the reference gas in such a way that the thermoacoustic sound wave is phase-shifted by 180° with respect to the sound wave.

In accordance with some example implementations, the gas sensor furthermore comprises a radiation source configured to generate the light incident in the housing on the basis of a modulation signal, wherein the heat source is configured to thermoacoustically excite the reference gas on the basis of the modulation signal in such a way that the thermoacoustic sound wave is inverted with respect to a thermoacoustic portion of the sound wave.

In some example implementations, the heat source is configured to thermoacoustically excite the reference gas in such a way that the thermoacoustic sound wave at least partly compensates for a thermoacoustic portion of the sound wave.

In accordance with some example implementations, the heat source is configured, for the purpose of selectively thermoacoustically exciting the reference gas, to emit thermal energy to the reference gas, the thermal energy being chosen depending on an amplitude of the microphone signal at a point in time at which the light incident in the housing contains no radiation components at wavelengths which can photoacoustically excite the reference gas.

In some example implementations, the heat source is a temperature sensor configured to generate an output signal depending on a temperature of the reference gas at a first point in time of operation and to emit thermal energy to the reference gas depending on a received supply power for the purpose of generating the thermoacoustic sound wave at a second point in time of operation.

In accordance with some example implementations, the temperature sensor is configured to emit the thermal energy depending on a modulation signal for a radiation source, wherein the radiation source is configured to generate the light incident in the housing on the basis of the modulation signal.

In some example implementations, the heat source is configured to thermoacoustically excite the reference gas in such a way that an amplitude of the thermoacoustic sound wave corresponds to an amplitude of a thermoacoustic portion of the sound wave.

Further example implementations relate to a method for operating a photoacoustic gas sensor comprising a hermetically sealed housing filled with a reference gas. The method comprises generating a microphone signal using a microphone arranged in the housing as a function of a sound wave based on light incident in the housing. Furthermore, the method comprises selectively thermoacoustically exciting the reference gas using a controllable heat source arranged in the housing in order to generate a thermoacoustic sound wave phase-shifted with respect to the sound wave.

In accordance with some example implementations, selectively thermoacoustically exciting the reference gas comprises thermoacoustically exciting the reference gas in such a way that the thermoacoustic sound wave is phase-shifted by 180° with respect to the sound wave.

In some example implementations, the method furthermore comprises generating the light incident in the housing on the basis of a modulation signal, wherein selectively thermoacoustically exciting the reference gas comprises thermoacoustically exciting the reference gas using the heat source on the basis of the modulation signal, so that the thermoacoustic sound wave is inverted with respect to a thermoacoustic portion of the sound wave.

In accordance with some example implementations, selectively thermoacoustically exciting the reference gas comprises thermoacoustically exciting the reference gas in such a way that the thermoacoustic sound wave at least partly compensates for a thermoacoustic portion of the sound wave.

In some example implementations, selectively thermoacoustically exciting the reference gas comprises emitting thermal energy to the reference gas, the thermal energy being chosen depending on an amplitude of the microphone signal at a point in time at which the light incident in the housing contains no radiation components at wavelengths which can photoacoustically excite the reference gas.

In accordance with some example implementations, the heat source is a temperature sensor, wherein the method furthermore comprises generating an output signal at a first point in time of operation depending on a temperature of the reference gas using the temperature sensor, and wherein selectively thermoacoustically exciting the reference gas comprises emitting thermal energy at a second point in time of operation depending on a received supply power using the temperature sensor.

In some example implementations, thermal energy is emitted using the temperature sensor depending on a modulation signal for a radiation source, wherein the method furthermore comprises generating the light incident in the housing using the radiation source on the basis of the modulation signal.

In accordance with some example implementations, selectively thermoacoustically exciting the reference gas comprises thermoacoustically exciting the reference gas in such a way that an amplitude of the thermoacoustic sound wave corresponds to an amplitude of a thermoacoustic portion of the sound wave.

Example implementations of the present disclosure can at least reduce the problems resulting from the fact that the photoacoustic effect occurs in conjunction with the thermoacoustic effect. For this purpose, example implementations of the present disclosure make use of the insight that the thermoacoustic effect can also be observed without a photoacoustic component. By way of example, infrared radiation of the emitter in the housing (which can also be referred to as a reference cell) brings about both a thermoacoustic component and a photoacoustic component. Owing to the existing phase coincidence of the photoacoustic effect and the thermoacoustic effect, an undesired superimposed sound level arises at the microphone. The e.g. broadband infrared emitter is periodically excited. If e.g. the temperature sensor is used as a heat source during the off phase, a sound level brought about purely by the thermoacoustic component results. An adjustment of the intensity of the thermoacoustic sources (here infrared emitter and temperature sensor), during alternating operation thereof, leads to a constant pressure ratio in the reference cell, as a result of which the thermoacoustic effect can be at least eliminated and a substantially purely photoacoustic measurement signal can be generated.

Example implementations of the present disclosure therefore relate to the use of a temperature sensor as heat source or of some other controllable heat source as an active heat source in the reference cell in order to avoid pressure fluctuations brought about by the two heat sources described during operation and also for the compensation of the thermoacoustic effect.

Example implementations of the present disclosure can thus make possible an active compensation of the thermoacoustic effect in photoacoustic applications. This can lead to a better SNR, better utilization of the measurement region and hence better measurement results.

The aspects and features that have been described together with one or more of the examples and figures described in detail above can also be combined with one or more of the other examples in order to replace an identical feature of the other example or in order additionally to introduce the feature into the other example.

The description and drawings present only the principles of the disclosure. Furthermore, all examples mentioned here are intended to be used expressly only for illustrative purposes, in principle, in order to assist the reader in understanding the principles of the disclosure and the concepts contributed by the inventor(s) for further development of the art. All statements herein regarding principles, aspects and examples of the disclosure and also concrete examples thereof encompass the counterparts thereof.

It goes without saying that the disclosure of a plurality of steps, processes, operations or functions disclosed in the description or the claims should not be interpreted as being in the specific order, unless this is explicitly or implicitly indicated otherwise, for example for technical reasons. The disclosure of a plurality of steps or functions therefore does not limit them to a specific order unless the steps or functions are not interchangeable for technical reasons. Furthermore, in some examples, an individual step, function, process or operation can include a plurality of partial steps, functions, processes or operations and/or be subdivided into them. Such partial steps can be included and be part of the disclosure of the individual step, provided that they are not explicitly excluded.

Furthermore, the claims that follow are hereby incorporated in the detailed description, where each claim can be representative of a separate example by itself. While each claim can be representative of a separate example by itself, it should be taken into consideration that—although a dependent claim can refer in the claims to a specific combination with one or more other claims—other examples can also encompass a combination of the dependent claim with the subject matter of any other dependent or independent claim. Such combinations are explicitly proposed here, provided that no indication is given that a specific combination is not intended. Furthermore, features of a claim are also intended to be included for any other independent claim, even if this claim is not made directly dependent on the independent claim.

What is claimed is:

1. A photoacoustic gas sensor, comprising:
a housing that is hermetically sealed and filled with a reference gas;
a microphone arranged in the housing and configured to generate a microphone signal as a function of a sound wave based on light incident in the housing; and
a controllable heat source arranged in the housing and configured to thermoacoustically excite the reference gas in order to generate a thermoacoustic sound wave, different from the sound wave, that is phase-shifted with respect to the sound wave such that the thermoacoustic sound wave is inverted with respect to a thermoacoustic portion of the sound wave.

2. The photoacoustic gas sensor as claimed in claim 1, wherein the heat source is configured to thermoacoustically excite the reference gas such that the thermoacoustic sound wave is phase-shifted by 180° with respect to the sound wave.

3. The photoacoustic gas sensor as claimed in claim 1, further comprising:
a radiation source configured to generate the light incident in the housing based on a modulation signal, and
wherein the heat source is configured to thermoacoustically excite the reference gas based on the modulation signal.

4. The photoacoustic gas sensor as claimed in claim 1, wherein the heat source is configured to thermoacoustically excite the reference gas such that the thermoacoustic sound wave at least partly compensates for the thermoacoustic portion of the sound wave.

5. The photoacoustic gas sensor as claimed in claim 1, wherein the controllable heat source is configured to thermoacoustically excite the reference gas to emit thermal energy to the reference gas based on an amplitude of the microphone signal at a point in time at which the light incident in the housing contains no radiation components at wavelengths which can photoacoustically excite the reference gas.

6. The photoacoustic gas sensor as claimed in claim 1, wherein the heat source is a temperature sensor configured to generate an output signal depending on a temperature of the reference gas at a first point in time of operation and to emit thermal energy to the reference gas depending on a received supply power for generating the thermoacoustic sound wave at a second point in time of operation.

7. The photoacoustic gas sensor as claimed in claim 6, wherein the temperature sensor is configured to emit the thermal energy depending on a modulation signal for a radiation source,
wherein the radiation source is configured to generate the light incident in the housing based on the modulation signal.

8. The photoacoustic gas sensor as claimed in claim 1, wherein the heat source is configured to thermoacoustically excite the reference gas such that an amplitude of the thermoacoustic sound wave corresponds to an amplitude of the thermoacoustic portion of the sound wave.

9. A method for operating a photoacoustic gas sensor comprising a hermetically sealed housing filled with a reference gas, wherein the method comprises:
generating, using a radiation source, light incident in the housing;
generating, using a microphone arranged in the housing and based on receiving the light incident in the housing, a microphone signal as a function of a sound wave; and
thermoacoustically, using a controllable heat source arranged in the housing, exciting the reference gas in order to generate a thermoacoustic sound wave, different from the sound wave, that is phase-shifted with respect to the sound wave and such that the thermoacoustic sound wave is inverted with respect to a thermoacoustic portion of the sound wave.

10. The method as claimed in claim 9, wherein the light incident in the housing is generated based on a modulation signal,
wherein the reference gas is thermoacoustically excited based on the modulation signal.

11. The method as claimed in claim 9, wherein the reference gas is thermoacoustically excited such that the thermoacoustic sound wave is phase-shifted by 180° with respect to the sound wave.

12. The method as claimed in claim 9, wherein the reference gas is thermoacoustically excited such that the thermoacoustic sound wave at least partly compensates for the thermoacoustic portion of the sound wave.

13. The method as claimed in claim 9, wherein thermoacoustically exciting the reference gas is to emit thermal energy to the reference gas based on an amplitude of the microphone signal at a point in time at which the light incident in the housing contains no radiation components at wavelengths which can photoacoustically excite the reference gas.

14. The method as claimed in claim 9, further comprising:
generating an output signal depending on a temperature of the reference gas at a first point in time of operation and to emit thermal energy to the reference gas depending on a received supply power for generating the thermoacoustic sound wave at a second point in time of operation.

15. The method as claimed in claim 14, further comprising:
emitting the thermal energy depending on a modulation signal for the radiation source.

16. The method as claimed in claim 9, wherein the reference gas is thermoacoustically excited such that an amplitude of the thermoacoustic sound wave corresponds to an amplitude of the thermoacoustic portion of the sound wave.

17. A photoacoustic gas sensor, comprising:
a housing, that is hermetically sealed and filled with a reference gas;
a microphone arranged in the housing and configured to generate a microphone signal as a function of a sound wave based on light incident in the housing; and
a temperature sensor arranged in the housing and configured to generate an output signal depending on a temperature of the reference gas at a first point in time of operation and to emit thermal energy to the reference gas depending on a received supply power to generate a thermoacoustic sound wave, different from the sound wave, at a second point in time of operation,
wherein the thermoacoustic sound wave is phase-shifted with respect to the sound wave.

18. The photoacoustic gas sensor as claimed in claim 17, wherein the temperature sensor is configured to emit the thermal energy depending on a modulation signal for a radiation source,
wherein the radiation source is configured to generate the light incident in the housing based on the modulation signal.

19. The photoacoustic gas sensor as claimed in claim 17, wherein the temperature sensor is configured to excite the reference gas in such a way that the thermoacoustic sound wave is phase-shifted by 180° with respect to the sound wave.

20. The photoacoustic gas sensor as claimed in claim 17, wherein the temperature sensor is configured to excite the reference gas in such a way that an amplitude of the thermoacoustic sound wave corresponds to an amplitude of a thermoacoustic portion of the sound wave.

* * * * *